US009489385B1

(12) United States Patent
Ladola

(10) Patent No.: US 9,489,385 B1
(45) Date of Patent: Nov. 8, 2016

(54) EXACT LOOK AND FEEL FOR SHAREPOINT ARCHIVED CONTENT

(71) Applicant: Symantec Corporation, Mountain View, CA (US)

(72) Inventor: Himanshu Ladola, Mountain View, CA (US)

(73) Assignee: Symantec Corporation, Mountain View, CA (US)

( * ) Notice: Subject to any disclaimer, the term of this patent is extended or adjusted under 35 U.S.C. 154(b) by 50 days.

(21) Appl. No.: 13/673,909

(22) Filed: Nov. 9, 2012

(51) Int. Cl.
*G06F 17/30* (2006.01)

(52) U.S. Cl.
CPC ..... *G06F 17/30073* (2013.01); *G06F 17/3089* (2013.01)

(58) Field of Classification Search
USPC .................................................. 707/661, 660
See application file for complete search history.

(56) References Cited

U.S. PATENT DOCUMENTS

| 8,683,031 | B2 * | 3/2014 | Green et al. ................... 709/224 |
| 2006/0047804 | A1 * | 3/2006 | Fredricksen ...... G06F 17/30902 709/224 |
| 2006/0106866 | A1 * | 5/2006 | Green et al. ............... 707/104.1 |
| 2008/0021921 | A1 * | 1/2008 | Horn ............................. 707/102 |
| 2008/0141116 | A1 * | 6/2008 | Mohan .......................... 715/236 |
| 2008/0141365 | A1 * | 6/2008 | Soegtrop ........... G06F 17/30011 726/21 |
| 2010/0082682 | A1 * | 4/2010 | Kinoshita ...................... 707/784 |
| 2012/0010995 | A1 * | 1/2012 | Skirpa et al. .............. 705/14.49 |
| 2012/0102176 | A1 * | 4/2012 | Lee et al. ...................... 709/223 |
| 2013/0290828 | A1 * | 10/2013 | Flake et al. ................... 715/234 |

OTHER PUBLICATIONS

"Converting a Page To CSS," by Eisenberg, Digital Web Magazine, published May 14, 2001.*
Kudelevsky, "Search for code duplicates in WebStorm/PhpStorm," http://blog.jetbrains.com/webide/2011/09/search-for-code-duplicates-in-phpstorm/, Posted on Sep. 28, 2011.*
Spurzem, Bob., "The Benefits of SharePoint Archiving," The Museum of E-Mail and Digital Communications, http://nuix.com/TopicPageTemplate.aspx?active_page_id=472, Jun. 8, 2009.
"Nuix—Nuix Collector Suite," http://web.archive.org/web/20110810222148/http://www.nuix.com/default3.asp?active, 2011.

* cited by examiner

*Primary Examiner* — Jay Morrison
(74) *Attorney, Agent, or Firm* — Womble Carlyle Sandridge & Rice LLP

(57) ABSTRACT

A system and method for archiving a version of a document are disclosed. The document to be archived may be web-based or written in a markup language. The content of the document is parsed. From a totality of style information accessed to display the document with an original display appearance, a subset of style information is determined. The subset of style information can impart a totality of the original display appearance to the document. An archival version of the document is created. The archival version of the document has the totality of style information represented by the subset of style information. The archival version of the document is stored. At least one of the actions of parsing, determining and creating is executed through a specially programmed processor.

20 Claims, 5 Drawing Sheets

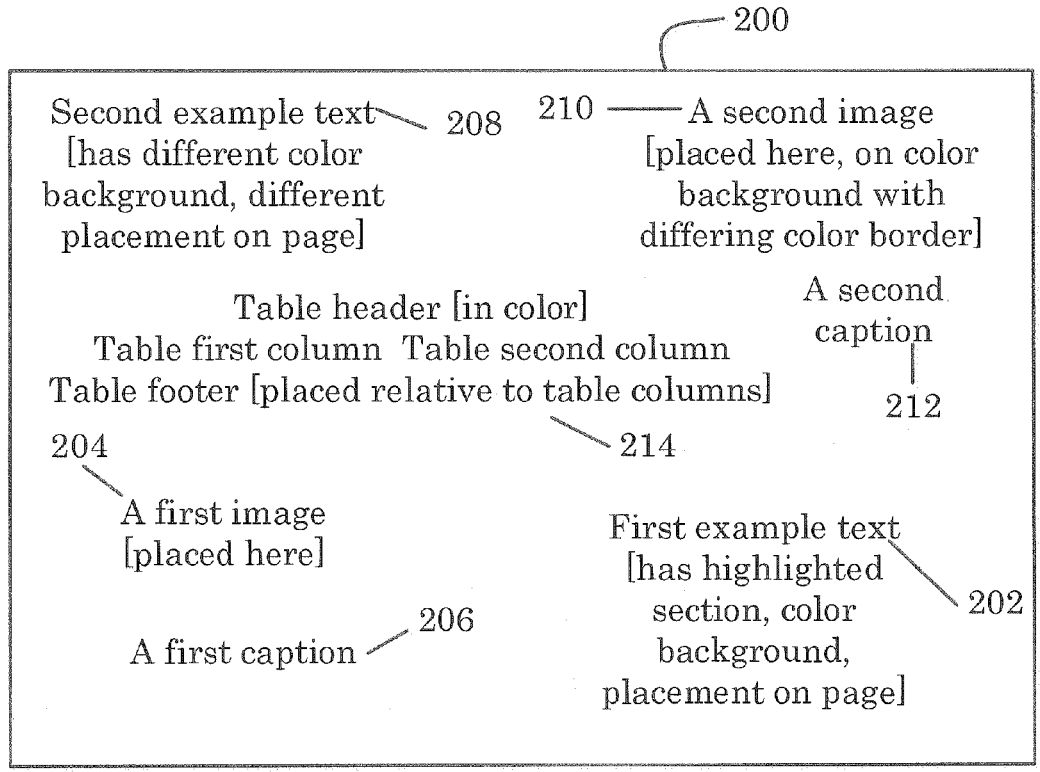
Visual Aid: Webpage [with styling described]    *Fig. 2a*
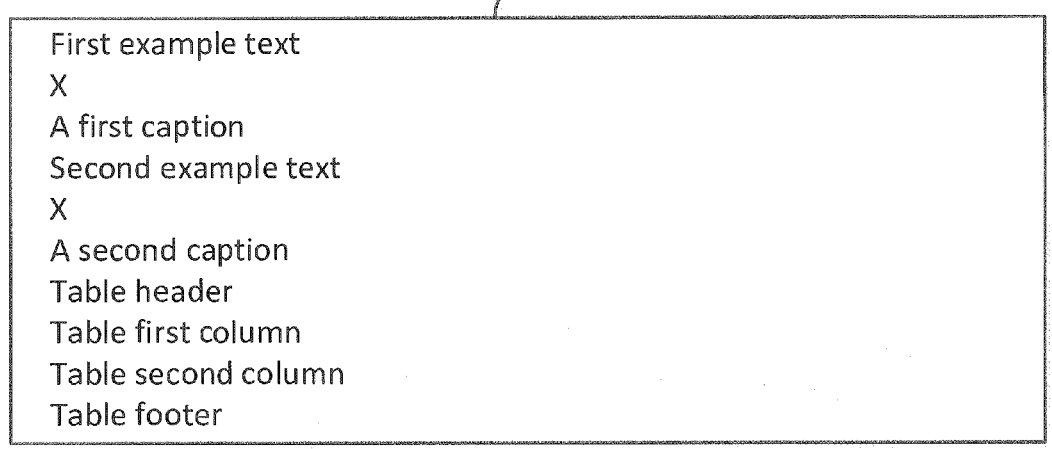
Visual Aid: Archived Webpage [without styling]    *Fig. 2b*

Document Archiving Software and Enterprise Archiving | SymantecNorton Small &
  Medium Business Enterprise PartnersEnterprise
United StatesShopping View Cart
  For Home
  Shop for Norton Products
  Upgrades
  Renewals
  Special Promotions
  Order Status / Download
  For Business
  Contact Sales
  Buy Online
  Renew Online
  Find A Reseller
  Buy SSL Certificates
  Purchase List
  Shopping Cart Products & Solutions Support & Communities Security Response Try & Buy PRODUCTS
& SERVICES
  Products A-Z
  Small Business Products
  Services
  Trialware
  Licensing, Renewals & Activation
  Support
  Training
MOST POPULAR PRODUCTS
  Backup Exec
  NetBackup
  Endpoint Protection
  Whole Disk Encryption
  Symantec SSL Products
  Storage Foundation
  Norton
SOLUTIONS
  Cloud
  Virtualization
  Mobile

.ms-rte-layoutszone-outer
.ms-rte-layoutszone-inner
.ms-rteElement-H3B
.ms-rteStyle-Tagline
.ms-rteStyle-Caption
.ms-rteStyle-Normal
.ms-rteElement-H1B
.ms-rteElement-Callout2
.ms-rteElement-H2B
.ms-rteStyle-Highlight
.ms-rteElement-Hr
.ms-rteTable-6
.ms-rteTable-6 TH.ms-rteTableHeaderRow-6
.ms-rteTable-6 TR.ms-rteTableFooterRow-6
.ms-rteTable-6 TH.ms-rteTableHeaderFirstCol-6
.ms-rteTable-6 TH.ms-rteTableFooterFirstCol-6
.ms-rteTable-6 TH.ms-rteTableHeaderOddCol-6
.ms-rteTable-6 TD.ms-rteTableFooterOddCol-6
.ms-rteTable-6 TH.ms-rteTableHeaderEvenCol-6
.ms-rteTable-6 TD.ms-rteTableFooterEvenCol-6
.ms-rteTable-6 TR.ms-rteTableOddRow-6
.ms-rteTable-6 TH.ms-rteTableFirstCol-6
.ms-rteTable-6 TR.ms-rteTableEvenRow-6

EXACT LOOK AND FEEL FOR SHAREPOINT ARCHIVED CONTENT

BACKGROUND

When a web-based document is displayed, the display appearance is known as the "look & feel" (alternatively "look and feel") of the document. The display appearance of the document is imparted by the style information of or pertaining to the document. Style information is also known as presentation semantics. Style information usually includes layout (i.e. placement of objects on a page), fonts, and color information. Style information may also include text alignment, sizes, borders, and spacing. A well-known technique for representing style information makes use of documents written in a markup language. A document written in a markup language can have style information inline in the document, or can reference one or more CSS (cascading style sheets) files that contain style information. CSS is a stylesheet language, used to style webpages. Commonly used markup languages include HTML (Hypertext Markup Language) and EML (a language for email or .eml files). EML adheres to the MIME (Multipurpose Internet Mail Extensions) standard. The MIME standard is useful in communication protocols such as HTTP (Hypertext Terminal Protocol), which requires data be transmitted in email-like messages. A document sent to a computing device of a user, using HTTP, can then be displayed on a display screen of the computing device, with the display appearance of the document controlled by the presentation semantics.

Server-based archiving systems store large numbers of documents from various origins and require a large amount of storage memory. In order to conserve storage memory space, many archiving systems store archival versions of documents with style information removed. An archival version of a document with style information removed is text-only, or may be text with a small amount of formatting such as font type and font size information. Archiving systems may store archival versions of documents with or without images included. Storage of archival versions of documents, with style information removed, is useful for search and retrieval purposes. However, the display appearance of a document is lost when the style information is removed. That is, when displaying an archived version of a document with style information removed, the display appearance is more basic, primitive or plain and does not match the display appearance of the original document (which was displayed using style information).

Therefore, there is a need in the art for an archiving solution which overcomes the drawbacks described above.

SUMMARY

In some embodiments, a method for archiving a version of a web-based document is provided. A content of the web-based document is parsed. From a totality of style information accessed to display the document with an original display appearance, a subset of style information is determined. The subset of style information can impart a totality of the original display appearance to the document. An archival version of the document is created. The archival version of the document has the totality of style information represented by the subset of style information. The archival version of the document is stored. At least one of the parsing, determining and creating is executed through a specially programmed processor.

In some embodiments, a non-transient, tangible, computer readable medium is provided. The medium has thereupon computer executable instructions. The instructions cause a computer to parse a content of a web-based document. The computer derives, from a totality of style information accessed in displaying the document, a subset of style information. The subset of style information retains ability to impart a totality of an original display appearance to the document, comparable to displaying the document with access to the totality of style information. The computer creates an archival version of the document. The archival version of the document has therewithin one from a set consisting of: the subset of style information, and a reference to a separate file having the subset of style information. The archival version of the document is then stored.

In some embodiments, an archiving system is provided. The archiving system includes at least one server. The server is connectable to a global information network, and is configured to store and retrieve archive documents and to access a document that references one or more cascading style sheets. The server is programmed to parse a content of the document. The server determines, from a totality of style information in the document and in the one or more cascading style sheets, a subset of style information. The subset of style information retains ability to impart a totality of the original display appearance to the document comparable to displaying the document using access to the one or more cascading style sheets. The server creates an archival version of the document. The archival version of the document has the subset of style information embedded therewithin. The server stores the archival version of the document.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 2A is an example visual aid for a webpage.

FIG. 2B is an example visual aid for an archived webpage, showing an archival version of the webpage of FIG. 2A stored without style information.

FIG. 3B is a screenshot of a text-only archival version of a portion of the webpage of FIG. 3A.

FIG. 4 is a screenshot of extracted style information for a webpage.

DETAILED DESCRIPTION

Figure 1:
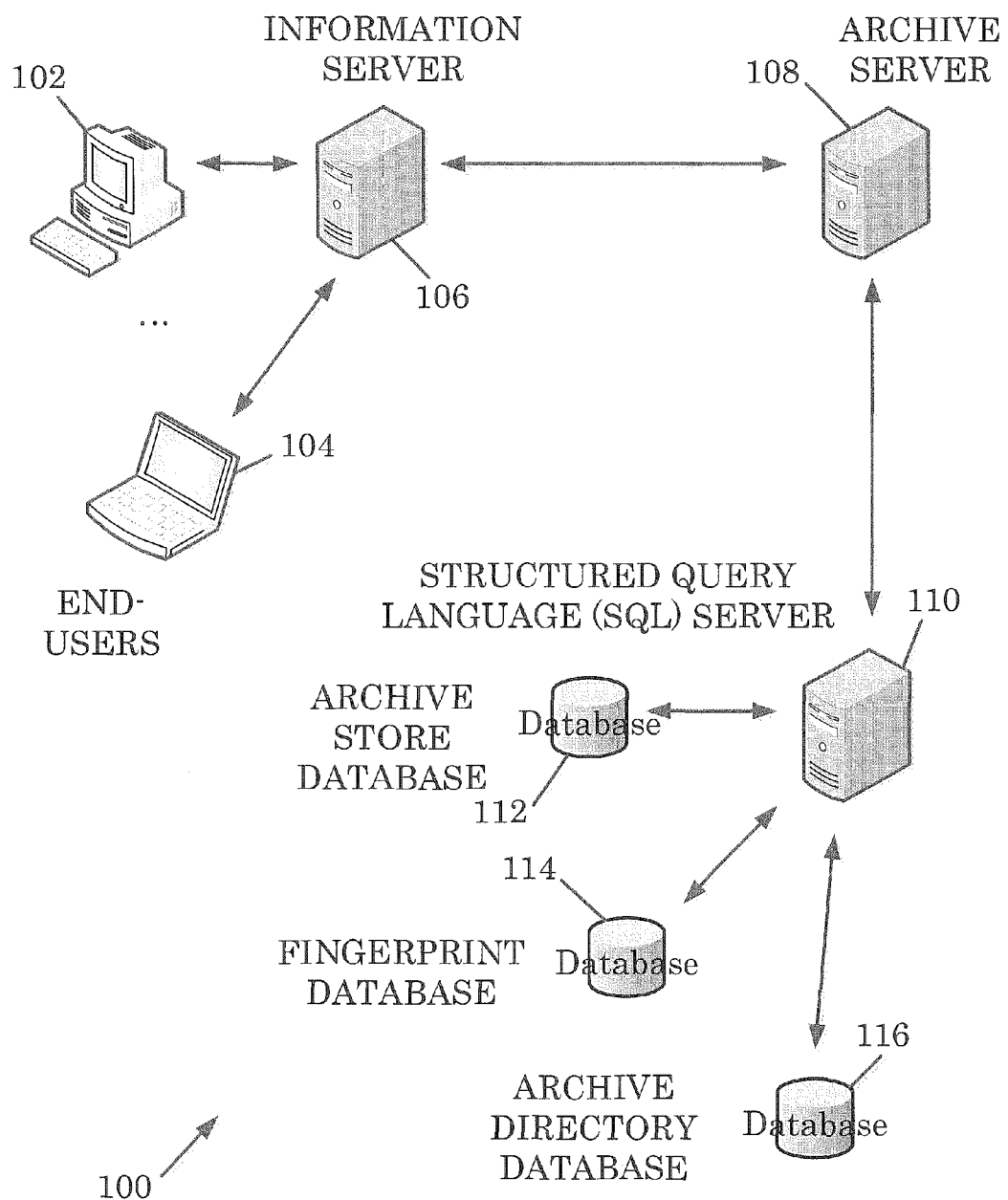
FIG. 1 is a system diagram of a server-based system that can store archival versions of documents in accordance with an embodiment of the present invention.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

The embodiments provide for archiving web based documents where an archival version of a document retains the display appearance, or "look and feel" of the original document. In some embodiments, a subset of style information is embedded or linked to the archived version of the document. In order to identify the style information associated with the document, the document is parsed, so that the archival version of the document can be created with the identified style information preserved for subsequent display. The archival version of the document can be stored, and exported as an independent item that retains the totality of the original display appearance. Known parsing techniques may be utilized to identify the style information, which may be CSS files. The identified style information may be stored inline in the archived document or in a separate file linked to the archived document. It should be appreciated that since the style information for a particular document, and not the entire style information for all web based documents, is stored with the document, the increased storage requirements are negligible.

In FIG. 1, a server-based system 100 has at least one server 106, 108, 110 and can store archival versions of documents. The server-based system 100 can perform the method of FIG. 5 as will be duly described. In one embodiment, the server-based system 100 includes one server that performs multiple functions. For example, the server-based system 100 can include the archive server 108, and be connectable to a global communication network such as the Internet. The archive server 108 can archive documents such as webpages, blogs, wiki pages, discussion threads, emails, etc., from a variety of sources such as websites, discussion boards, email servers, social media, information servers, shared work environment servers, computing devices of end-users, etc. In some embodiments, the archive server 102 may be referred to as a backup server that facilitates data storage and access. In one embodiment, the data stored or archived (e.g., a mailbox backup (e.g., a brick-level backup), a file-level backup, an aggregate data backup (e.g., a SharePoint Image, an Exchange Database Image and/or the like)) includes various types of data items (e.g., emails, journal entries, contacts, notes, web documents, word documents, spreadsheets and/or the like). According to one or more embodiments of the present invention, the archive server 108 cooperates with archival software (e.g., SYMANTEC ENTERPRISE VAULT™) to maintain content stored on the archive server. In a further embodiment, the server-based system 100 includes an information server 106 and an archive server 108. In a still further embodiment, the server-based system 100 includes an information server 106, an archive server 108, and an SQL (Structured Query Language) server 110, as described below.

An information server 106 communicates with computing devices 102, 104 of end-users, sending files for display on the computing devices 102, 104 for example during Internet sessions requested by the end-users. When a web-based document is displayed on one of the computing devices 102, 104, the document has an original display appearance as imparted by style information of or pertaining to the document. The original display appearance is also known as the "look & feel" of the document. An archive server 108 communicates with the information server 106. The archive server 108 receives a file of a document to be archived, from the information server 106, and stores the file of the document. In one embodiment, the archive server 108 stores the file of the document directly in the archive store database 112, and can retrieve the file from the archive store database 112.

In a further embodiment as shown in FIG. 1, the archive server 108 stores the file of the document via the SQL server 110. As each document is archived, the SQL server 110 stores the archival version of the document in the archive store database 112, stores a fingerprint of the document in the fingerprint database 114, and stores a reference to the archived version of the document in the archive directory database 116. Searching of archived documents is performed by the SQL server 110. The information server 106 can pass a search request from a user to the SQL server 110, via the archive server 108, for an archive search. When the SQL server 110 receives a query, for example a search request, the SQL server 110 attempts to find a matching fingerprint of one or more documents in the fingerprint database 114. Upon finding such a match, the SQL server 110 looks for a reference to an archived version of the document in the archive directory database 116. When a user requests a document to be retrieved from the archives, for example after reviewing the search results, the archive server requests that the SQL server 110 retrieve the document from the archive store database 112. Other types of queries and activities may further apply. Searching techniques, databases and systems are well known and are not herein discussed in further detail.

FIG. 2A shows an example visual aid for a webpage 200, for purposes of illustrating the displaying and archiving processes. An actual webpage constructed according to the visual aid for the webpage 200 could be displayed on one of the computing devices 102, 104, and could be archived by the server-based system 100. Styling of the webpage is described in the example visual aid in square brackets. An actual display of a webpage would have an actual image, an actual table, and actual formatted and placed text, etc., placed as objects on the page. These objects have styling or style information that is textually described in the square brackets in the shown example. The styling of the actual webpage would be coded as style information of the document, e.g., using HTML and references to CSS files.

In the visual aid for the webpage 200, a first example text 202 is placed near the lower right corner of the webpage as displayed. Style information imparts a highlighted section and a color background to the first example text 202, and directs the placement of the text on the webpage. A first image 204 is placed near the lower left corner of the webpage, and is accompanied by a first caption 206 placed below the image. The style information directs the placement of the first image and the first caption. A second example text 208 is placed near the upper left corner of the webpage. Style information imparts a different color background and a different placement on the page to the second example text 208. A second image 210 is placed near the upper right corner of the webpage. Style information directs a color background and a different color border, as well as the placement of the second image 210. A second caption 212 is placed below the second image 210, as directed by the style information. A table 214 is placed among the images and texts, with placement and color of the table header and placements of the table first column, table second column and table footer directed by the style information. The style information can also include size information, alignment, and different placements of objects for different types of displays.

FIG. 2B shows an example visual aid for an archived webpage 220, in which the archival version of the document is stored without style information. The retrieved archival version of the document is displayed with plain text, and lacks the original display appearance of the document, i.e., lacks styling. The plain text content of the original document is sequentially displayed and is not placed as originally arranged in the styled document. In the example visual aid for the archived webpage 220 as shown, images are not stored but are indicated by an "X". In archiving systems that store copies of images without style information, the retrieved archival version of the document is displayed with an image in place of the respective "X". As with the text, the image is not placed as originally arranged in the styled document, as the original style information is unavailable.

Figure 3A:
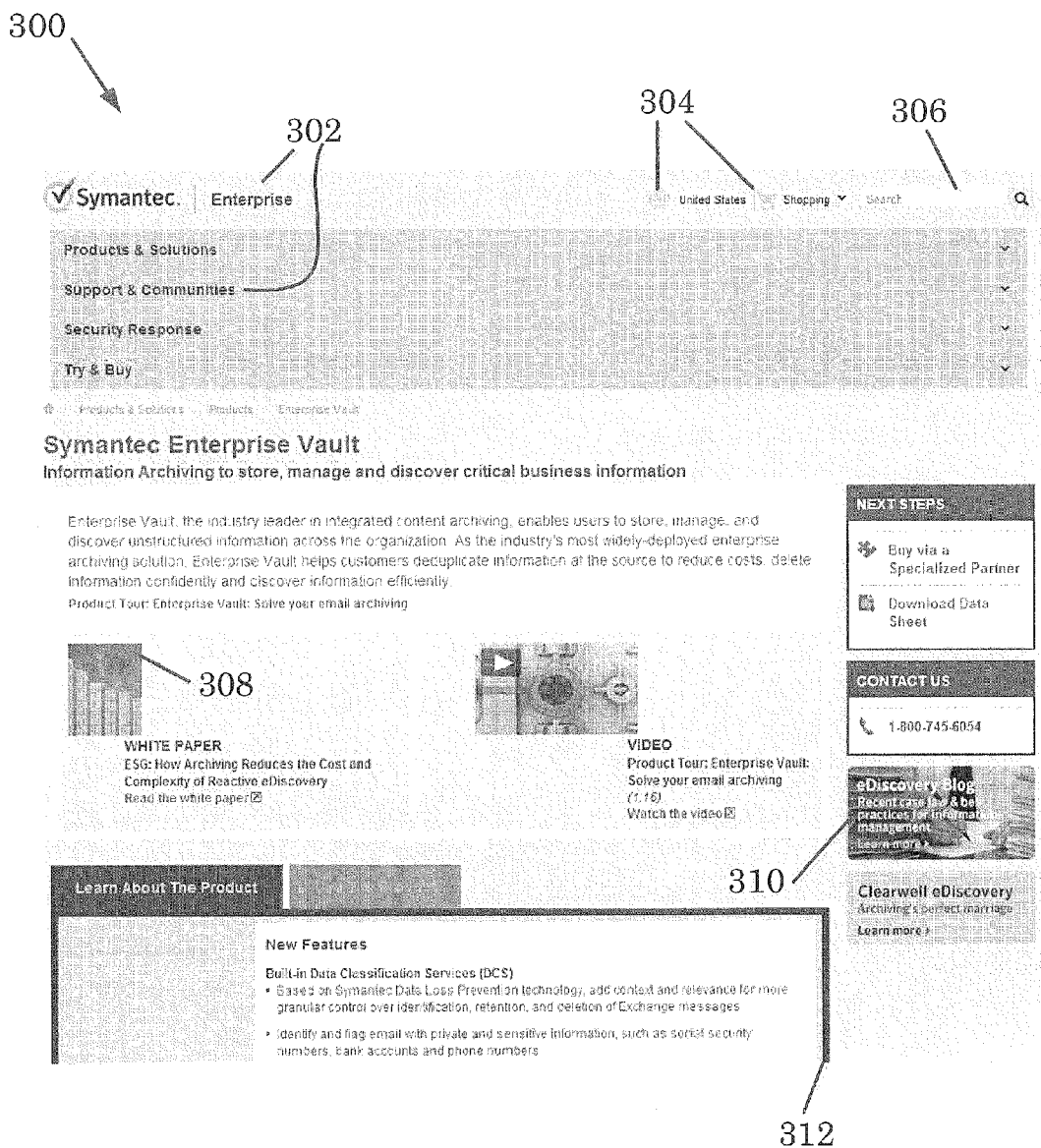
FIG. 3A is a screenshot of an actual webpage that incorporates style information.

FIG. 3A shows a screenshot of an actual webpage 300, captured as originally displayed. Text 302 and various objects 304, 306, 308, 310 are placed on the webpage in an arrangement or layout dictated by the style information. In this example, text 302 is placed on various colored backgrounds in various alignments. Graphical objects 304, such as a globe symbol and a shopping cart symbol, are placed on various colored or shaded backgrounds. A dialog box 306 is placed on a background. A chart 308 is placed on a background, near some text. A photographic image with overlaid text 310 in white is placed on a gray background. One box has a black border 312 defined. A person skilled in the art will recognize these and other types and placements of text and objects on webpages as directed by the style information.

Generally, the original display appearance of such a webpage or other web-based document is imparted by style information or presentation semantics, acting on attributes in the web-based document. For example, a document can be written in a markup language such as HTML, with attributes embedded in the file identifying sections of text as headers, footers, columns, tables etc. Presentation semantics can then state and direct placement of the sections of text, and graphical objects such as images, illustrations, charts, dialog boxes, buttons etc. The presentation semantics can reside in one or more CSS files, which are referenced by the document, i.e., referenced in the document file. Alternatively, the presentation semantics can reside inline in the document file, as embedded style information. Presentation semantics can reside in a combination of embedded style information inline in the document file and in one or more CSS files.

FIG. 3B shows what the webpage 300 looks like as a text-only version 320. The screenshot captures a portion of the text for purposes of illustration. As is plainly visible in the text-only version 320, the text portions are not in the same position as in the original display of the actual webpage 300, as all of the style information has been lost. In an archived version that keeps text and images but omits style information, the images and text would be stored in columnar form and would not have the same positional relationship as in the original display of the actual webpage 300.

FIG. 4 shows a portion of the extracted style information 400 for a webpage. This example is for illustration purposes, and does not necessarily pertain to the screenshot of the actual webpage 300. The extracted style information may include information about inner and outer layout zones, taglines, captions, highlighting, table header, table footer, table columns, table rows, etc. It should be appreciated that the embodiments capture specific style information based upon the usage of styles as identified through a parsing technique. In some embodiments, styles used for navigation/menu or any other styles that are not relevant to the content are not captured during the parsing as these styles do not impact the look and feel of the document. In addition, the embodiments enable a reduction of the size of an item in archive as the style information associated with the particular document is stored rather than the complete style information of a certain style standard or programming language, e.g., the CSS language. Furthermore, the embodiments also reduce the size of items while the items are exported for eDiscovery solutions, while maintaining the exact look and feel of the documents, which may be important for eDiscovery solutions.

Figure 5:
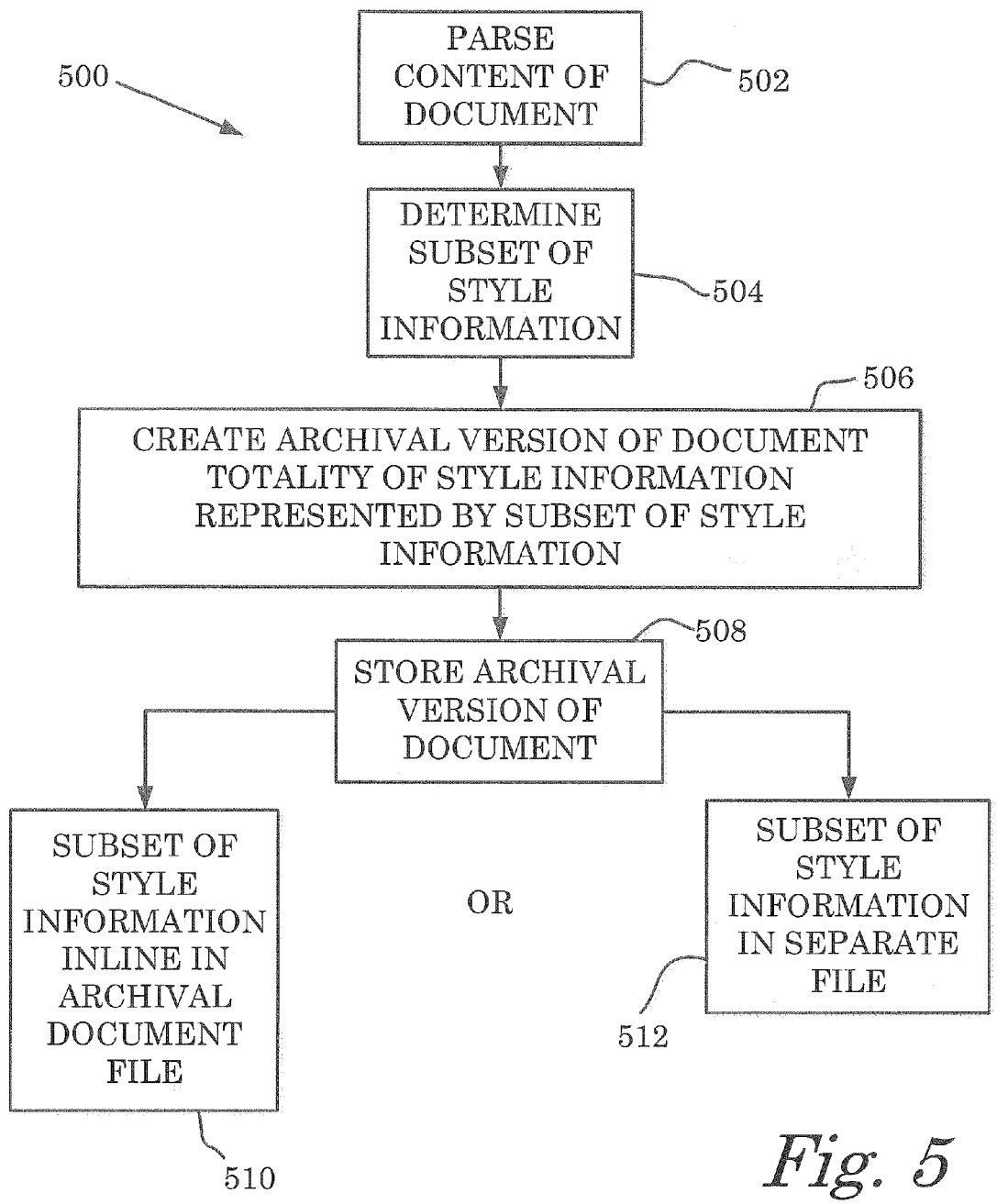
FIG. 5 is a flow diagram of an embodiment of a method for storing an archival version of a document, using a subset of style information.

FIG. 5 shows a method 500 for archiving a version of a document, in which the archival version of the document retains the ability to be displayed with the totality of the original display appearance of the document. The archival version of the document has a subset of style information that represents or is representative of the original totality of style information. For example, the subset of style information is a subset of the CSS sheets referenced by the document, which in turn is a subset of the entire style information represented through the CSS language. In a block 502 of the method 500, the content of the original document is parsed. Parsing the document determines the totality of the style information, as distinct from text information and/or image information of the document. In one example, regarding CSS files, the totality of the style information would include all of the style information on all of the CSS files or CSS sheets referenced by a document to be displayed and would further include all of the style information, if any, inline in the document file. In some embodiments, the navigation/menu or non relevant style information is not captured through the parsing. The style parser is able to understand CSS 2.0 and CSS 3.0 rules and parse style information accordingly in some embodiments. It should be appreciated that the parser can be written based upon any style information programming language, as alternate style parsers can be integrated in the embodiments.

In a block 504, a subset of the style information is determined. The subset of style information is extracted from or derived from the totality of style information, such that the subset of style information can impart a totality of the original display appearance to the document. In one example, each portion of style information that is called upon in displaying a document is extracted from the totality of style information, through the parsing, and saved with other such extractions as relate to the document. This may be accomplished by applying intelligent content processing followed by ingesting style information in some embodiments. Thus, in one embodiment, a portion of style information from a CSS style sheet is saved rather than the entirety of the style information from the CSS sheet.

In a block 508, an archival version of the document is stored. This may be accomplished by ingesting the archival version into an archival storage memory through archival software in one embodiment. In another embodiment, in a block 510, the subset of style information is stored inline in the archival document file, i.e. the subset of style information is embedded inline in the archival version of the document. In an example of this embodiment, the collected style definitions are written as inline style definitions in the MIME format. In a further embodiment, in a block 512, the subset of style information is stored in a separate file, and is referenced by the archival version of the document.

Storing an archival version of the document with a subset of style information takes less memory storage than saving the document with the totality of style information, e.g., the entire style information of the CSS sheet utilized by the document. In one example, storing an archival version of a webpage takes an average of 5 kB (kilobytes) for the subset of style information. This presents a savings of 180 kB as compared to storing the webpage and copies of all of the CSS file types for the CSS programming language.

CSS files generally have style information applicable to a wide variety of webpages. As a statistical probability, individual documents typically do not make use of all of the style information in the CSS file(s) referenced by the document. Usually, a document to be displayed accesses one or more CSS files but makes use of only a fraction or portion of the style information in the CSS file or files referenced by the document. It is this subset of style information that is determined and stored with the archival version of the document in embodiments of the present method and system. For example, a document may make use of less than about 10% of the totality of the style information in the cascading style sheets. Embodiments of the present method and system apply this statistical probability in a practical manner to reduce storage needs for archiving, while retaining or preserving the display appearance of the document.

It would be feasible to preserve the original display appearance of a document by storing the original file along with copies of the entire CSS file or files as referenced by the document. Further, to preserve the original display appearance of a document, a web-server/browser-based system could be devised to retain entire CSS files and store original document files as-is. However, the method 500 for archiving a version of the document provides flexibility in that the archival version of the document can be presented or exported as separate from or "unplugged" from the need to route through the server having the entire CSS files for all documents archived. The archival version of the document, with the subset of style information, can be displayed independently of cascaded style sheets.

The archival version of the document with the subset of style information can be exported as an independent item, either as a single file with the subset of style information as inline style information or as a document file accompanied by and referencing a separate file having the subset of style information. This exportable independent item is sent with a smaller overall size than sending the original document and copies of all of the CSS files referenced by the document, and can be displayed independently of the original CSS files. Thus, the disclosed archiving method and system provide storage savings that are additive over a large number of documents, and provide transmission bandwidth savings that are additive over a large number of documents. Retrieving the archival version of the document with the subset of style information allows display of the archival version in a manner that retains all of the original display appearance of the document. Yet, the archival version of the document is relieved of dependency on the original Web server with the original CSS files. As text of the original document is entirely present in the archival version of the document, searching is both possible and effective in the archival version.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The embodiments can also be embodied as computer readable code on a computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. The embodiments may be integrated into a cloud computing environment and system. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments, such as a cloud computing environment, where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method for archiving a version of a web-based document, comprising:
    parsing a content of the web-based document;
    determining, from a totality of style information accessed to display the document with an original display appearance, a subset of style information that can impart a totality of the original display appearance to the document;
    creating an archival version of the document, with the subset of style information embedded therewithin, wherein the archival version of the document has a first file and a second file, the first file referencing style information in the second file, the first file and the second file independent of further archival versions of further documents; and
    storing using an archival server the archival version of the document, a fingerprint of the document and a reference to the archival version of the document in respective separate databases via a database server;
    wherein at least one of parsing, determining and creating is executed through a specially programmed processor.

2. The method of claim 1, wherein:
    the archival version of the document, inclusive of the subset of style information, takes less memory storage as compared to storing the web-based document with the totality of style information included.

3. The method of claim 1, wherein:
    in displaying the document, the original display appearance is imparted by attributes in the web-based document, and presentation semantics residing in one or more members of the set consisting of one or more cascading style sheets and the web-based document; and
    the subset of style information includes a subset of all presentation semantics residing on the one or more cascading style sheets and the web-based document.

4. The method of claim 1, wherein:
    the web-based document is written in a markup language.

5. The method of claim 1, further comprising:
    deriving the subset of style information from the totality of style information;
    wherein creating the archival version of the document includes:
        embedding a portion of the subset of style information in an inline manner within the first file of the archival version of the document.

6. The method of claim 1, further comprising:
    storing a totality of the subset of style information in the second file.

7. The method of claim 1, wherein creating the archival version of the document includes removing a difference between the totality of style information and the subset of style information, resulting in the subset of style information remaining in the archival version of the document.

8. The method of claim 1, wherein the subset of style information is a subset of style information from a cascading style sheet.

9. The method of claim 1 further comprising exporting the archival version of the document as an independent item that retains the totality of the original display appearance.

10. The method of claim 1 wherein the totality of style information pertaining to the content of the document resides partially in the document and partially in one or more cascading style sheets.

11. A non-transient, tangible, computer readable medium having thereupon instructions for a computer to:
    parse a content of a web-based document;
    derive, from a totality of style information accessed in displaying the document, a subset of style information that retains ability to impart a totality of an original display appearance to the document comparable to displaying the document with access to the totality of style information;
    create an archival version of the document having therewithin a reference to a separate file having at least a portion of the subset of style information or the subset of style information embedded therewithin, the separate file unique to the archival version of the document and not shared with further archival versions of further documents; and
    store using an archival server the archival version of the document, a fingerprint of the document and a reference to the archival version of the document in respective separate databases via a database server.

12. The computer readable medium of claim 11, wherein:
    the archival version of the document, with the subset of style information, can be displayed independently of cascaded style sheets.

13. The computer readable medium of claim 11, wherein:
    the subset of style information includes a subset of all presentation semantics of one or more cascading style sheets referenced by or included in the web-based document.

14. The computer readable medium of claim 11, wherein:
    creating the archival version of the document includes writing a further portion of the subset of style information into the archival version of the document in an inline manner.

15. The computer readable medium of claim 11, wherein:
    the subset of style information is essentially reduced to a minimum that retains the totality of the original display appearance.

16. The computer readable medium of claim 11 having thereupon further instructions for the computer to:
    export the archival version of the document, with the separate file, as an independent item that includes the subset of style information and thereby retains the totality of the original display appearance.

17. An archiving system comprising:
    at least one server that is connectable to a global information network and is configured to store and retrieve archive documents and to access a document that references one or more cascading style sheets;

the at least one server being programmed to:

parse a content of the document;

determine, from a totality of style information in the document and in the one or more cascading style sheets, a subset of style information that retains ability to impart a totality of the original display appearance to the document comparable to displaying the document using access to the one or more cascading style sheets;

create an archival version of the document, with the subset of style information embedded therewithin, the archival version of the document having a first file and a second file that are exportable independent of other archival versions of other documents, wherein the first file includes a reference to style information in the second file; and store using a dedicated archival server the archival version of the document, a fingerprint of the document and a reference to the archival version of the document in respective separate databases via a database server;

wherein the archival version of the document takes less memory storage as compared to storing the web-based document and storing the one or more cascading style sheets.

18. The archiving system of claim 17, wherein:

the at least one server includes an information server and an archive server in communication with each other.

19. The archiving system of claim 18, further comprising:

a statistical query language server communicating with the archive server;

an archive store database communicating with the statistical query language server;

a fingerprint database communicating with the statistical query language server; and an archive directory database communicating with the statistical query language server.

20. The archiving system of claim 17 wherein:

the at least one server is further programmed to export the archival version of the document as an independent item that retains the totality of the original display appearance.

* * * * *